(12) United States Patent
Malament et al.

(10) Patent No.: US 11,080,072 B1
(45) Date of Patent: Aug. 3, 2021

(54) CUSTOM USER INTERFACE FOR A TRIHYBRID DATA MOVEMENT, DATA GOVERNANCE AND DATA PROVENANCE SYSTEM

(71) Applicant: Bank of America Corporation, Charlotte, NC (US)

(72) Inventors: David Malament, Concord, NC (US); Jeff L. Howard, Charlotte, NC (US); Prasad Dasari, Charlotte, NC (US); Daniel Metz, Sleepy Hollow, NY (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 16/858,777

(22) Filed: Apr. 27, 2020

(51) Int. Cl.
| | |
|---|---|
| *G06F 3/0482* | (2013.01) |
| *G06F 9/451* | (2018.01) |
| *G06F 3/0483* | (2013.01) |
| *G06F 16/27* | (2019.01) |
| *G06F 9/54* | (2006.01) |

(52) U.S. Cl.
CPC ............ *G06F 9/451* (2018.02); *G06F 3/0482* (2013.01); *G06F 3/0483* (2013.01); *G06F 9/541* (2013.01); *G06F 16/27* (2019.01)

(58) Field of Classification Search
CPC .................................................. G06F 3/0482
See application file for complete search history.

(56) References Cited

U.S. PATENT DOCUMENTS

| | | |
|---|---|---|
| 7,533,128 B1 | 5/2009 | Sanchez et al. |
| 8,380,787 B2 | 2/2013 | Anand et al. |
| 8,601,029 B2 | 12/2013 | Anand et al. |
| 8,788,815 B1 | 7/2014 | Garcia et al. |
| 8,930,331 B2 | 1/2015 | McGrew et al. |
| 9,607,063 B1 | 3/2017 | Cao et al. |
| 9,817,877 B2 | 11/2017 | Taranov |
| 10,120,904 B2 | 11/2018 | Ranganathan |

(Continued)

OTHER PUBLICATIONS

"Apache Nifi: An Easy to Use, Powerful, and Reliable System to Process and Distribute Data," https://nifi.apache.org/, The Apache Software Foundation, 2018.

(Continued)

*Primary Examiner* — Brian W Wathen
(74) *Attorney, Agent, or Firm* — Weiss & Arons LLP; Michael A. Springs, Esq.

(57) ABSTRACT

A user interface for interfacing with a trihybrid data movement, data governance and data provenance system is provided. The user interface may include an application selection drop-down field that enables selection of an application. The user interface may include a deliveries tab. When selected, the deliveries tab may display the status of user subscription deliveries. The user interface may include a resources tab. When selected, the resources tab may display publications and/or subscriptions that have been set up. When selected, the resources tab may enable a user to create a new publication. The user interface may include an approvals tab. When selected, the approvals tab may display approvals relating to subscriptions that have been requested. The user interface may include a data catalog tab. When selected, the data catalog tab may display a plurality of available publications, and enable a user to request a subscription to a publication.

19 Claims, 14 Drawing Sheets

(56) References Cited

U.S. PATENT DOCUMENTS

| | | |
|---|---|---|
| 10,171,635 B2 | 1/2019 | Alves et al. |
| 10,205,767 B2 | 2/2019 | Lee et al. |
| 10,248,810 B2 | 4/2019 | Bisaga |
| 10,452,625 B2 | 10/2019 | Mukherjee et al. |
| 2015/0163160 A1* | 6/2015 | Lawrence ............. G06F 9/5077 709/226 |

OTHER PUBLICATIONS

"Autosys Tutorials: Autosys Quick Reference," http://autosys-tutorials.blogspot.com/2011/04/autosys-quick-reference.html, Retrieved on Feb. 20, 2020.

"Apache NiFi," https://en.wikipedia.org/wiki/Apache_NiFi, Wikimedia Foundation, Inc., Nov. 12, 2019.

* cited by examiner

Processor Details — 302

▷ Running — 304

| SETTINGS | SCHEDULING — 306 | PROPERTIES — 308 | COMMENTS — 310 | ⚙ STOP & CONFIGURE — 312 |

Required field — 314

| Property — 316 | Value — 318 |
|---|---|
| Database Connection Pooling Service — 320 | Root_DBCPConnectionPoolLookup — 322 |
| SQL Pre-Query — 324 | No value set — 326 |
| SQL select query — 328 | Select ${columns} FORM ${table} WHERE ${rowFilter} — 330 |
| SQL Post-Query — 332 | No value set — 334 |
| Max Wait Time — 336 | 0 seconds — 338 |
| Normalize Table/Column Names — 340 | false — 342 |
| Use Avro Logical Types — 344 | false — 346 |
| Compression Format — 348 | NONE — 350 |
| Default Decimal Precision — 352 | 10 — 354 |
| Default Decimal Scale — 356 | 0 — 358 |
| Max Rows Per Flow File — 360 | 0 — 362 |
| Output Batch Size — 364 | 0 — 366 |

| DISTRIBUTE | CIDW ▼ —702 | | | |
|---|---|---|---|---|
| Deliveries —704 | PUBLICATIONS  SUBSCRIPTIONS —716 | | | Create Publication —718 |
| Resources —706 | —714 | | | |
| Approvals —708 | | 732 | 722 —724 | |
| Data Catalog —710 | Name —720 | Type | Created At | Actions —730 |
| Configurations —712 | CRP Publication | ORACLE | Feb 26, 2020, 06:42:08 AM | 🗑 |
| | General Ledger Dimension | ORACLE | Feb 12, 2020, 10:25:30 AM | 🗑 |
| | Test | ORACLE | Mar 2, 2020, 08:00:25 AM | 🗑 |
| | Test Date Format | ORACLE | Feb 12, 2020, 11:56:20 AM | 🗑 |

FIG. 7

| DISTRIBUTE | | | | | |
|---|---|---|---|---|---|
| Deliveries | | | | | |
| Resources | CIDW ▽ | | | | |
| Approvals | PUBLICATIONS | General Ledger Dimension —802 | | | |
| Data Catalog | | Publication Details | | | |
| Configurations | Name | | | | |
| | CRP Publication | CONNECTION | Exadata —804 | | |
| | General Ledger Dim | SCHEMA | RISK_RPT —806 | | |
| | Test | TABLE | DIM_GL_BANK —808 | | |
| | Test Date Format | COLUMNS SELECTION | 11 —810 | | |
| | | ROW FILTER | 1=1 —812 | | |
| | | FEED SIZE | S —814 | | |
| | | NAME | General Ledger Dimension —816 | | |
| | | DESCRIPTION | Dimension table for general ledger published daily | | |
| | | | 818 | | |
| | | | | 820— Save | |

FIG. 8

| DISTRIBUTE | | | | | | |
|---|---|---|---|---|---|---|
| Deliveries | CIDW ▽ | | | | | |
| Resources — 902 | | | | | | |
| Approvals | PUBLICATIONS  SUBSCRIPTIONS | | | | | |
| Data Catalog | 904 | | | 906 | | |
| Configurations | Publication | Deliveries | Status | Total Runtime | Start Time | EndTime | Snapshot |
| | ◁ Test Date Format — 908 | | SUCCESS | 8.46 s | Feb 24, 2020 11:53:29 AM | Feb 24, 2020 11:53:37 AM | VIEW |
| | Test Date Format | Another Subscription | SUCCESS | 6.91 s | Feb 24, 2020 11:53:30 AM | Feb 24, 2020 11:53:37 AM | VIEW |
| 910 ▷ | Test Date Format | | SUCCESS | 10.024 s | Feb 20, 2020 12:14:43 AM | Feb 20, 2020 12:14:53 AM | VIEW |
| 912 ▷ | Test Date Format | | SUCCESS | 671.84 s | Feb 20, 2020 11:43:10 AM | Feb 20, 2020 11:54:22 AM | VIEW |
| 914 ▷ | Test Date Format | | SUCCESS | 31.62 s | Feb 20, 2020 11:39:14 AM | Feb 20, 2020 11:39:46 AM | VIEW |
| 916 ▷ | Test Date Format | | SUCCESS | 31.333 s | Feb 20, 2020 10:33:20 AM | Feb 20, 2020 10:33:51 AM | VIEW |
| 918 | | | | | | |

FIG. 9

| DISTRIBUTE | ATLAS ▽ | | | | | |
|---|---|---|---|---|---|---|
| Deliveries | PUBLICATIONS  SUBSCRIPTIONS | | | | | |
| Resources | 1002  1004 | | | | | |
| Approvals | | | | | | |
| Data Catalog | Publication | Type | Application | Latest Run | Description | |
| Configurations | Test —1006 | ORACLE | CIDW | Feb 24, 2020, 11:52:30 AM | test | SUBSCRIBE |
| | CRP Publication —1008 | ORACLE | CIDW | Feb 24, 2020, 11:53:30 AM | This is demonstration publication | SUBSCRIBE |
| | General Ledger Dimension | ORACLE | CIDW | Feb 24, 2020, 11:52:30 AM | Dimension table for general ledger published daily | SUBSCRIBE |
| | Test Date Format (Subscribed) | ORACLE | CIDW | Feb 24, 2020, 11:53:30 AM | test data format | SUBSCRIBE AGAIN |

| DISTRIBUTE | ATLAS ▾ | | | | |
|---|---|---|---|---|---|
| Deliveries | APPROVALS          MY SUBMISSIONS —1208 | | | | |
| Resources | —1202      ⌐1206 | | | | |
| Approvals | Reference No | Requested Publication | Requesting Application | Requestor | Submitted Time | Status |
| Data Catalog | 000001 | CRP Publication | Atlas | cl 12c1e | Feb 24, 2020, 11:53:30 AM | Pending —1210 |
| Configurations | | | | | | |

FIG. 12

CUSTOM USER INTERFACE FOR A TRIHYBRID DATA MOVEMENT, DATA GOVERNANCE AND DATA PROVENANCE SYSTEM

FIELD OF TECHNOLOGY

This disclosure relates to manipulating the transferring data between different data systems.

BACKGROUND OF THE DISCLOSURE

Entities may include numerous systems and subsystems. These systems and subsystems may be used to perform routine functions. The systems and/or subsystems may include databases, computer applications, computer platforms, network servers, network applications and other suitable systems and/or subsystems.

Many times, within an entity, there are requests, requirements and/or obligations, to transfer data from a first system to one or more other systems. Conventionally, these data transfers have been executed by custom-written software scripts. Therefore, for each data transfer, a custom software script must be written and executed. It should be appreciated that custom script writing is both time-consuming and resource-consuming. Because each script must be customized for the particular transfer for which it is used, these scripts are typically error-prone.

In addition, many entities have data governance and data provenance requirements. For the purposes of this application, data governance may be understood to refer to an identification of which sub-entity is responsible, or which sub-entity owns, a predetermined data set at a predetermined point in time and/or at a predetermined location. For the purposes of this application, data provenance may be understood to refer to the data lineage—i.e., where a predetermined data set originated from, and where the predetermined data set was located since the generation of the predetermined data set.

In order to comply with these data governance and data provenance requirements, entities may include data governance and/or data provenance databases. Conventionally, there may be multiple data governance and/or data provenance databases. Each of the data governance and/or data provenance databases may be required to access each custom-scripted data transfer in order to retrieve the data governance and/or data provenance data.

As discussed above, these custom scripted data transfers may be error-prone, and therefore, the data governance and/or data provenance data may be error-prone as well. Additionally, because of the large volume of data transfers within an entity, custom-written scripts that facilitate each custom scripted data transfer may be cumbersome as well as error-prone. Furthermore, keeping the data governance/data provenance aspect synchronized with the data transfer may be complex.

Therefore, it would be desirable for a data transfer system that centralizes data movement between systems. Such a data transfer system would preferably eliminate the need to write custom scripts for data set transfers. Furthermore, such a data transfer system would enable multiple subscribers to subscribe to data sets published by a single data publisher.

It would be further desirable for the data transfer system to perform both data governance and data provenance. Such a data transfer system may keep track of who owns the data as well where the data traveled.

It would be further desirable to enable data governance and/or data provenance systems to access the data from the centralized system. Such a data transfer system may eliminate the need for data governance and/or data provenance systems to access multiple individual data transfers.

It would be yet further desirable to provide a user interface. Such a user interface may enable a user to manipulate, and record, the data transfers between different systems.

SUMMARY OF THE DISCLOSURE

A user interface for interfacing with a trihybrid data movement, data governance and data provenance system is provided. The user interface may include an application selection drop-down field. The application selection drop-down field may enable the user to select an application.

The user interface may include a deliveries tab. The deliveries tab, when selected, may display a status of subscription deliveries.

The user interface may include a resources tab. The resources tab, when selected, may display publications and/or subscriptions that have been set up. The resources tab, when selected, may enable a user to create a new publication.

The user interface may include an approvals tab. The approvals tab, when selected, may display approvals relating to subscriptions that have been requested.

The system may include a distribute module. The distribute module may include a user interface. The distribute module may include a first application programming interface. The first application programming interface may be an application programming interface written in any suitable programming language. The first application programming interface may also be referred to as a distribute application programming interface.

The distribute application programming interface may communicate with the user interface. The distribute application programming interface may execute the backend processing for the user interface.

The distribute module may also include a distribute module database. The distribute module database may communicate with the distribute application programming interface. The distribute module database may include a metadata store.

The distribute module may also include a data engine. The data engine may include a data engine application programming interface. The data engine application programming interface may be a second application programming interface. The data engine may also include a publisher flow application. The publisher flow application may communicate with the data engine application programming interface. The data engine may also include a subscriber flow application. The subscriber flow application may communicate with the publisher flow application.

The system may also include a publisher. The publisher may include a job scheduler. The job scheduler may trigger the publishing of one or more publications. A publication may be a time-based snapshot of data that may be retrieved, by the distribute module, from the publisher's datastore. The publisher's datastore may be a database, file system, data platform or any other suitable data storage location. The publishing of the one or more publications may include publishing one or more links to the one or more publications. The publisher may also include a publisher datastore. The publisher datastore may include the one or more publications.

The system may also include a subscriber. The subscriber may include a subscriber server. The subscriber server may receive the one or more publications.

In some embodiments, the system may include a plurality of subscribers. Each subscriber, included in the plurality of subscribers, may include a subscriber server. Each subscriber may register a subscription to at least one of the one or more publications. During the subscription registration, each subscriber may select at least one of the one or more publications. Also, during the subscription registration, each subscriber may be provided the option to customize the subscription of the selected publications. The customizing may include selection and/or deselection of one or more tables, columns and/or rows within the selected publications. As such, when the one or more publications are published, each subscriber may receive a customized version of the selected publications. The customized version may also be referred to herein as a predetermined subset of a publication. A predetermined subset of a publication may be specified by a subscriber.

The job scheduler may trigger the publishing of a publication, included in the one or more publications, by calling an endpoint on the distribute application programming interface. The calling may include transmitting a unique identifier from the job scheduler to the distribute application programming interface. The unique identifier may be generated for the publication when the publication is registered. The unique identifier may be generated by the distribute module database when the publication is registered. The unique identifier may be stored in the metadata store included in the distribute module database. The unique identifier may also be stored in the distribute module database external to the metadata store. The unique identifier may also be stored in the distribute application programming interface. The unique identifier may also be stored in the publisher datastore.

The distribute application programming interface may retrieve publisher metadata and subscriber metadata from the metadata store included in the distribute module database. The publisher metadata may relate to the act of publication. The publisher metadata may relate to the data included within the publication itself. The publisher metadata may include a location of the publication. The location of the publication may be a predetermined location within the publisher datastore.

The subscriber metadata may relate to the subscriber. The subscriber metadata may include a location operable to receive the publication.

In certain embodiments, when multiple subscribers subscribe to a single publication, the subscriber metadata may include the plurality of subscribers. In such embodiments, the subscriber metadata may include metadata relating to each of the subscriber's customized version of the subscription. As such, the subscriber metadata may include, for each subscriber, the predetermined subset of the publication as specified by the subscriber.

The distribute application programming interface may combine the publisher metadata and the subscriber metadata into one metadata payload. The distribute application programming interface may transmit the one metadata payload to the data engine application programming interface.

The data engine application programming interface may transmit the one metadata payload to the publisher flow application. The publisher flow application may retrieve the publication to be published from the publisher datastore. The retrieval may be based on the one metadata payload.

The publisher flow application may transmit the retrieved publication and the one metadata payload to the subscriber flow application. The one metadata payload may be used to filter the retrieved publication based on custom subscriber request.

A user may setup customization of the publication at either the publisher flow and/or the subscriber flow. In some embodiments, the publisher flow may filter and/or customize the publication. In certain embodiments, the subscriber flow application may filter and/or customize the publication for the subscriber based on the subscriber metadata included in the one metadata payload. In embodiments where multiple subscribers subscribe to one publication, the subscriber flow application may filter and/or customize the publication for each subscriber included in the plurality of subscribers. The filtering and/or customization may be based on the subscriber metadata included in the one metadata payload.

The subscriber flow application may transmit the filtered publication to the subscriber server. In embodiments where multiple subscribers subscribe to a single publication, a customized version of the publication, or predetermined subset of the publication as specified by the subscriber, may be transmitted to each subscriber server.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which:

FIG. 3 shows yet another illustrative diagram in accordance with principles of the disclosure;

FIG. 7 shows yet another illustrative diagram in accordance with principles of the disclosure;

FIG. 8 shows still another illustrative diagram in accordance with principles of the disclosure;

FIG. 9 shows yet another illustrative diagram in accordance with principles of the disclosure;

FIG. 10 shows still another illustrative diagram in accordance with principles of the disclosure;

FIG. 12 shows still another illustrative diagram in accordance with principles of the disclosure;

DETAILED DESCRIPTION OF THE DISCLOSURE

Figure 1:
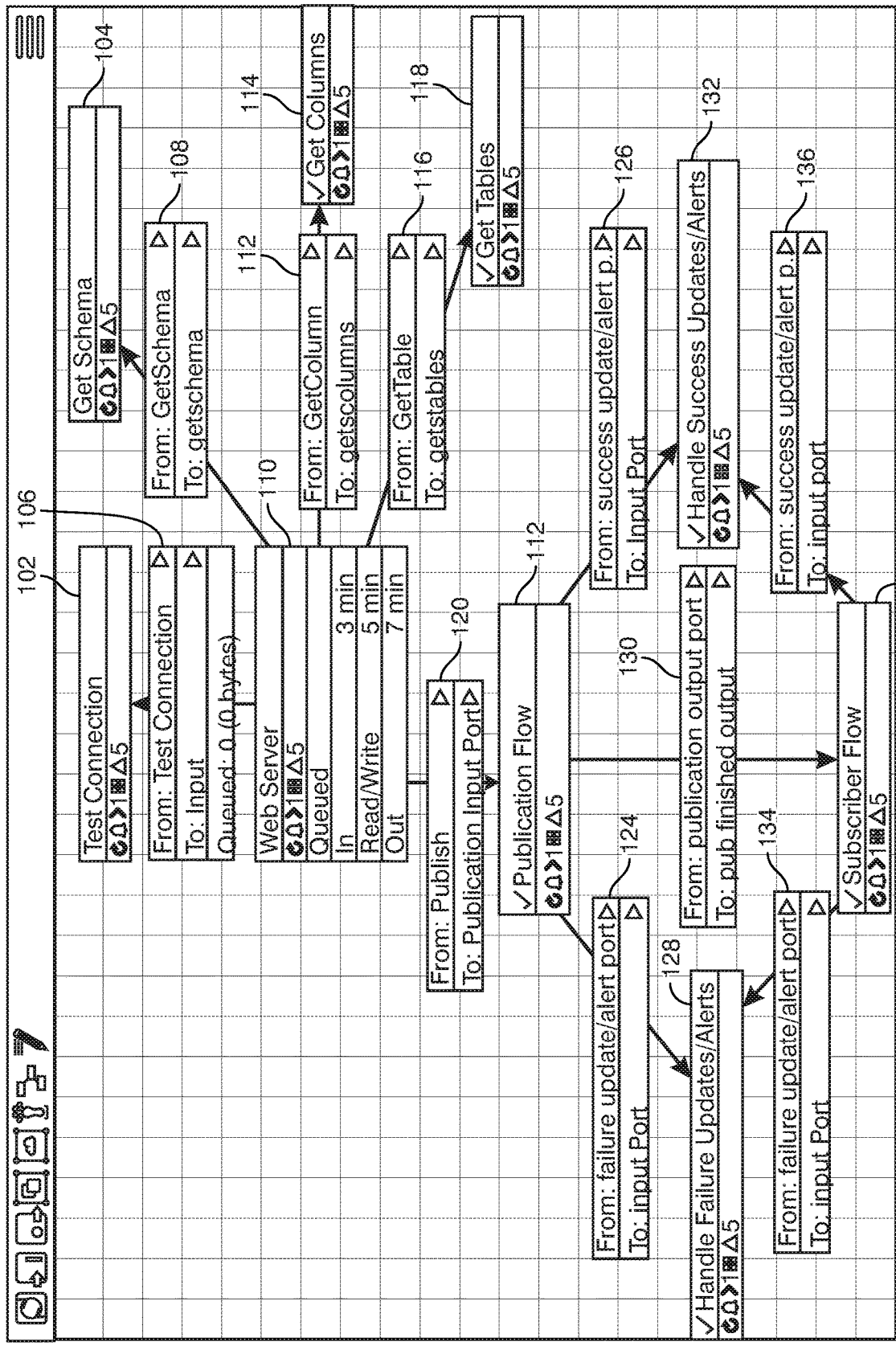
FIG. 1 shows an illustrative diagram in accordance with principles of the disclosure.

A method for interfacing with a trihybrid data movement, data governance and data provenance system is provided.

The method may include receiving an application selection at a user interface. A distribute application programming interface may command, or provide the backend for, the user interface.

The method may include displaying, at a deliveries tab within the user interface, a status of user subscription deliveries. The user subscription deliveries may be identified by the application selection. As such, if the user selects a predetermined application, user subscription deliveries that are associated with the predetermined application may be displayed. It should be appreciated that there may be multiple applications. Each application may be associated with a different plurality of user subscription deliveries. It should be further appreciated that a user may only be able to select a specific application if the user has the required permissions to access the specific application. The user interface may only display applications to which the user has access.

The method may include displaying, at a resources tab within the user interface, user publications and/or subscriptions that have been set up. The method may include displaying at an approvals tab within the user interface, user approvals relating to subscriptions that have been requested.

The method may include displaying, at a data catalog tab, within the user interface, a plurality of available publications. The method may include enabling, at the data catalog tab within the user interface, receipt of subscription requests to one or more publications included in the plurality of available publications.

The method may include receiving a request to register a publication. The request may be received from a publisher. The request may be received at the resources tab within the user interface.

The method may include displaying a plurality of database and/or connection questions at the user interface. The method may include receiving a set of responses to the plurality of database and/or connection questions. The receiving may be implemented at the user interface.

The method may include fetching, from a datastore linked to the publisher, a list of tables, columns and rows included in the publication. The method may include presenting the list of tables, columns and rows to the publisher via the user interface.

The method may include receiving a selection of a list of tables, columns and rows to be published. The selection may be received at the user interface. The selected list of tables, columns and rows to be published may be a subset of the publication. The selected list of tables, columns and rows to be published may be the entirety of the publication.

The method may include receiving a registration confirmation from the publisher via the user interface. The method may include transmitting a set of publication metadata to a metadata store upon receipt of the registration confirmation. The metadata store may be included in a distribute database. The transmitting may be via a distribute application programming interface. The set of publication metadata may include the set of responses and the selection of the list of tables, columns and rows. The set of publication metadata may also include a location of where the publication may be retrieved. Such a location may be a database address within a database linked to the publisher.

A unique identifier may be generated for a publication upon receipt of the registration confirmation from the publisher. The set of publication metadata may also include the unique identifier. The unique identifier may be used to retrieve the publication metadata when the publication is published. The unique identifier may also be transmitted from the distribute module to the publisher. The publisher may store the unique identifier within a job scheduler and/or a database linked to the publisher.

In some embodiments, the interactions between the publisher and the user interface may be implemented directly between the publisher and the distribute application programming interface. Such interactions may be batch interactions or other such interactions.

The method may include receiving a request to subscribe to the publication. The request may be received at the user interface. The method may include displaying the set of publication metadata to the subscriber. The displaying may be via the user interface.

The method may include receiving, from the subscriber, a selection of one or more tables, columns and/or rows from the set of publication metadata. The selection may be received at the user interface.

The method may include receiving a subscription confirmation from the subscriber via the user interface. Upon receipt of the registration confirmation from the subscriber, the method may include transmitting a set of subscription metadata to the metadata store via the distribute application programming interface. The set of subscription metadata may include a subscriber datastore location. The subscriber datastore location may be a location, included on a subscriber server or datastore, that is operable to receive the publication. The set of subscription metadata may include the selection received from the subscriber.

The method may include triggering the publishing of the publication by calling an endpoint the distribute application programming interface. A job scheduler may execute the triggering. The job scheduler may be located at a publisher location. The calling may include transmitting the unique identifier from the job scheduler to the distribute application programming interface.

The method may include retrieving the set of publication metadata and the set of subscription metadata from the metadata store. The distribute application programming interface may execute the retrieving.

The method may include combining the set of publication metadata and the set of subscription metadata in a metadata payload. The metadata payload may be a single metadata payload or a plurality of metadata payloads.

The method may include transferring the metadata payload from the distribute application programming interface to a data engine application programming interface. The method may include identifying the publisher at the data engine application programming interface. The publisher identification may be based on the metadata payload.

The method may include the data engine application programming interface calling the publication flow application. The calling may include transferring the metadata payload to the publication flow application. The method may include using the metadata payload at the publication flow application to retrieve the publication from the database linked to the publisher.

The method may include transmitting the publication and the set of subscription metadata from the publication flow application to a subscription flow application. The method may include customizing the publication into a subscriber-customized publication at the subscription flow application. The customizing may be based on the set of subscription metadata. It should be appreciated that, in the event that multiple subscribers subscribe to a single publication, each subscriber may have its own subscriber metadata. As such, the subscriber flow application may customize the publication for each subscriber.

The method may include transmitting the subscriber-customized publication from the subscription flow application to a server associated with the subscriber. Also, in the event that multiple subscribers subscribe to a single publication, each customized subscription may be transmitted to the appropriate subscriber server.

It should be appreciated that multiple publications and/or multiple subscriptions may be stored within the metadata store of the distribute module. As such, the distribute module may maintain records of the various publications and/or subscriptions within an entity. The distribute module may identify a publication, subscribers that subscribe to the identified publication and a history of the data transfer between a publisher and a subscriber. As such, the distribute module may maintain records of the datastores that were traversed between the publisher and the subscriber. For example, publication A originates in datastore A within publisher A's domain and is transferred to datastore G within subscriber G's domain, via datastores N, H, K and the distribute module. This metadata relating to the transfer of a publication—i.e., publication A is transferred from datastore A to datastore G via datastores N, H and K—may be stored within the distribute module. This metadata relating to the transfer of the publication may also be used when determining lineage, governance and/or provenance of a data set.

This metadata relating to the transfer of the publication may also be used to perform data localization. Data localization may ensure that a publication moves through a specific set of datastores and/or servers from the source location to the target location. This is notable when a publication is required to be maintained within specific boundaries, such as country borders.

The data engine application programming interface, the publication flow application and the subscription flow application may be included in a data engine. The user interface, the distribute application programming interface and the distribute database may be external to the data engine. The method may include accessing the data engine by a plurality of data provenance, data governance and data movement databases. The accessing may be in order to retrieve data relating to data movement of the publication. Such data relating to data movement may include the datastores that were traversed between the publisher and the one or more subscribers.

It should be appreciated that, because the system provides both data movement and data lineage capture, such a system may provide provable data lineage on an element basis in addition to a publication basis. For example, the data engine may provide traceable lineage for each element included in each publication.

The data engine may also perform data checking on the publication to ensure the completeness of the publication transfer. As such, the data engine may count tables, columns and/or rows within the publication when the publication is retrieved. The data engine may also count tables, columns and/or rows within the publication as the publication is transferred to the subscriber.

The data engine may check to ensure that the retrieved publication was transferred in its entirety.

The data engine may also provide the data transfer capabilities; however, the data engine may not change the publication because the data engine may not be the originator, or own, the publication.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows an illustrative diagram. The illustrative diagram shows a recipe for an application programming interface. The application programming interface may interface or provide the backend for a user interface.

The application programming interface may communicate with processors that retrieve data. Such data may include schema data, column data, row data and table data.

The application programming interface may also communicate with processors that move data between publishers and subscribers. The application programming interface may generate a java script object notation ("JSON") object.

The user interface that interacts with the application programming interface provides a user the ability to generate a JSON object. Because the user interface interfaces with the application programming interface, the user interface may instruct the application programming interface regarding the contents of the generated JSON object.

The following may illustrative an illustrative publication setup. Web server 110 may be an application programming interface. Upon receipt of database connection details at the user interface, web server 110 may communicate with test connection 102 to test the received database connection. Web server 110 may communicate test connection processor 102 via queue 106. The data flow connection may include a queuing system to handle the large amount of data inflow. These queues, such as queue 106, can handle large number of files in order to enable the processor to process the files serially.

Web server 110 may communicate with get schema 104 to retrieve all schemas relating to the received database connection. Web server 110 may communicate with get schema 104 via queue 108.

Web server 110 may communicate with get column 114 to retrieve all columns relating to the received database connection. Web server 110 may communicate with get columns 114 via queue 112.

Web server 110 may communicate with get table 118 to retrieve all tables relating to the received database connection. Web server 110 may communicate with get tables 118 via queue 116.

Web server 110 may interface with the user interface to display the retrieved schemas, columns and tables to the user. The user interface may enable the user to select one or more schemas, columns and/or tables. The selected schemas, columns and/or tables may be embodied in a JSON object.

It should be appreciated that the processors that retrieve the schemas, columns and tables may exist in order to provide a backend or support for the user interface.

The application programming interface may also be linked to the recipe that moves the data between publishers and subscribers. The application programming interface may be triggered when a publication is published. The recipe for moving the data between publishers and subscribers may include publication flow processor 122, subscriber flow processor 138, failure alert handing processor 128 and success alert handling processor 132.

Queues 124, 126, 130, 134 and 136 may temporarily hold files prior to being processed by the processor in the event that the processor is unavailable or busy. Queues 124, 126, 130, 134 and 136 may enable the processors to process the files serially.

Publication flow processor 122 may utilize the JSON object to identify the location of the publication and the details regarding the publication, such as schema, row and column data. Publication flow processor 122 may retrieve the publication from the identified publication location.

Subscriber flow processor 138 may filter and/or customize the publication for the subscriber. Subscriber flow processor 138 may transmit the customized publication to the subscriber server.

Failure alert handling processor 128 and success alert handling processor 132 may provide failure and success alert handling for failures and/or successes from publication flow processor 122 and subscriber flow processor 138.

Web server may 110 may communicate with publication flow processor 122, via queue 120. Publication flow processor 122 may retrieve the publication, based on the JSON object, from a database linked to the publisher.

Figure 2:
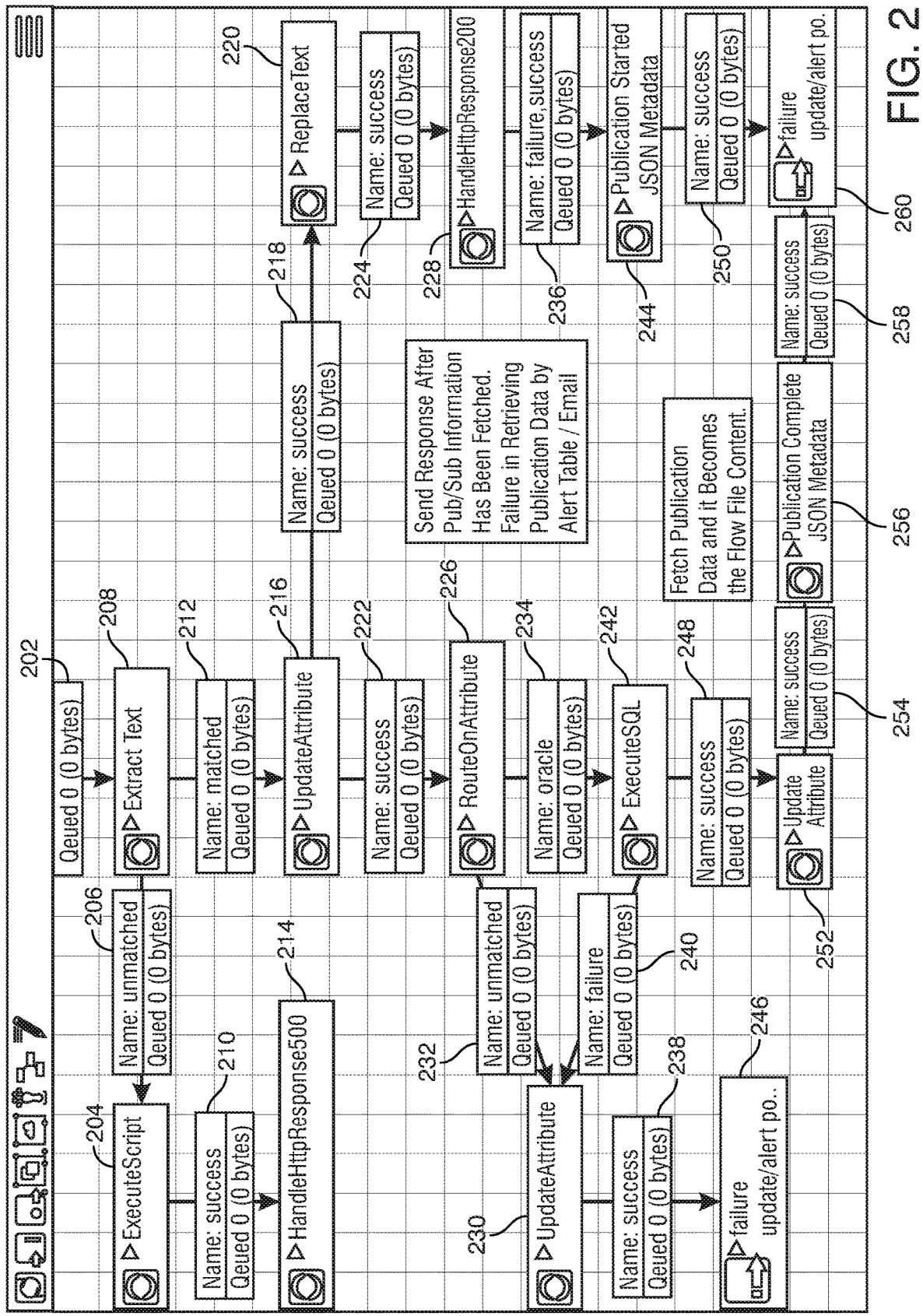
FIG. 2 shows another illustrative diagram in accordance with principles of the disclosure.

FIG. 2 shows an illustrative diagram. The illustrative diagram shows a recipe for generating JSON objects based on data received from the user via the user interface. It should be appreciated that the properties of the various processors shown in the recipe are dynamic. As such, the same recipes may be used multiple times in order to generate various different JSON objects.

The recipe may include the following processors: processor 204—execute script, processor 214—handle http response, processor 208—extract text, processor 216—update attribute, processor 226—route on attribute, processor 230—update attribute, processor 242—execute structured query language ("SQL"), processor 252—update attribute, processor 256—publication complete JSON metadata, processor 220—replace text, processor 228—handle http response and processor 244—publication started JSON metadata.

The recipe may also include the following queues: queue 210, queue 238, queue 206, queue 232, queue 240, queue 202, queue 212, queue 222, queue 234, queue 248, queue 218, queue 224, queue 236, queue 250, queue 254 and 258. Each of the queues may temporarily hold files prior to being processed by the processor in the event that the processor is unavailable or busy. Each of the queues may also enable the processors to process the files serially.

The recipe may also include failure update/alert handlers 246 and 260.

A user may enter text into an entry field on a user interface. Text extraction processor 208 may extract text from the entry field. The entered text may relate to a publication.

In the event that the text does not match a predetermined text string, execute script processor 204 may trigger a handle http response processor 214. Handle http response processor 214 may present the user, via the user interface, a message that the extracted text does not match a predetermined text string.

In the event that the text does match a predetermined text string, update attribute processor 216 may update an attribute based on the received text string. Route on attribute 226 may route the attribute.

In the event that the attribute route is unmatched, update attribute processor 230 may update the attribute. In the event that the attribute updating fails, failure handler 246 may be triggered.

Route on attribute processor 226 may trigger execute SQL processor 242. Execute SQL processor 242 may fetch publication data. The publication data may become the flow file content. In the event that execute SQL processor 242 fails, update attribute processor 230 may update the attribute.

Upon fetching the publication data, execute SQL processor 242 may trigger the update attribute processor 252. Update attribute processor 252 may trigger publication complete JSON metadata 256. In the event that the publication is incomplete, failure handler 260 may be triggered.

Update attribute processor 216 may also trigger replace text processor 220. Replace text processor 220 may replace the text, within the JSON object, with the text received from the user via the user interface. Replace text processor 220 may transmit a response after publication/subscription information has been fetched. Handle http response 228 may transmit a failure and/or success alert by alert table and/or email.

Handle http response 228 may trigger publication started JSON metadata processor 244. If publication started JSON metadata fails, failure handler 260 may report the failure.

FIG. 3 shows an illustrative diagram. The diagram shows exemplary details of an exemplary processor. Processor details 302 may include settings tab 304, scheduling tab 306, properties tab 308 and comments tab 310. Processor details 302 may be open to properties tab 308.

Properties tab 308 may include required field 314. Required field 314 may include properties, as shown at 316, and values, as shown at 318.

Database connection pooling service property, shown at 320, may be set to a value of ROOT_DBCPConnectionPoolLookup, as shown at 322. It should be appreciated that ROOT_DBCPConnectionPoolLookup may be a dynamic value. As such, the value may change based on dynamically received data. Therefore, the processor may be reusable in order to generate multiple different JSON objects.

SQL pre-query property, shown at 324, may have no value set, as shown at 326. As such, the SQL pre-query property may be dynamically allocated based on the data received from a user via the user interface.

SQL select query property, shown at 328, may be set to Select ${columns} from ${table} where ${row filter}, as shown at 330. It should be appreciated that the symbol "${ }" indicates a dynamic, as opposed to a static, variable.

SQL post-query property, shown at 332, may have no value set, as shown at 334.

Max wait time property, shown at 336, may be set to zero seconds, as shown at 338.

Normalize table/column names property, shown at 340, may be set to false, as shown at 342.

Use logical types property, shown at 344, may be set to false, as shown at 346. Logical types may utilize a row-oriented remote procedure call and data serialization framework. Logical types may also utilize JSON for defining data types and protocols. Logical types may also serialize data in a compact binary format.

Compression format property, shown at 348, may be set to NONE, as shown at 350. Default decimal precision property, shown at 352, may be set to 10, as shown at 354. Default decimal scale property, shown at 356, may be set to zero, as shown at 358. Max rows per flow file, shown at 360, may be set to zero, as shown at 362. Output batch size, shown at 364, may be set to zero, as shown at 366. Stop and configure button 312 may enable a user to stop and configure the processor.

Figure 4:
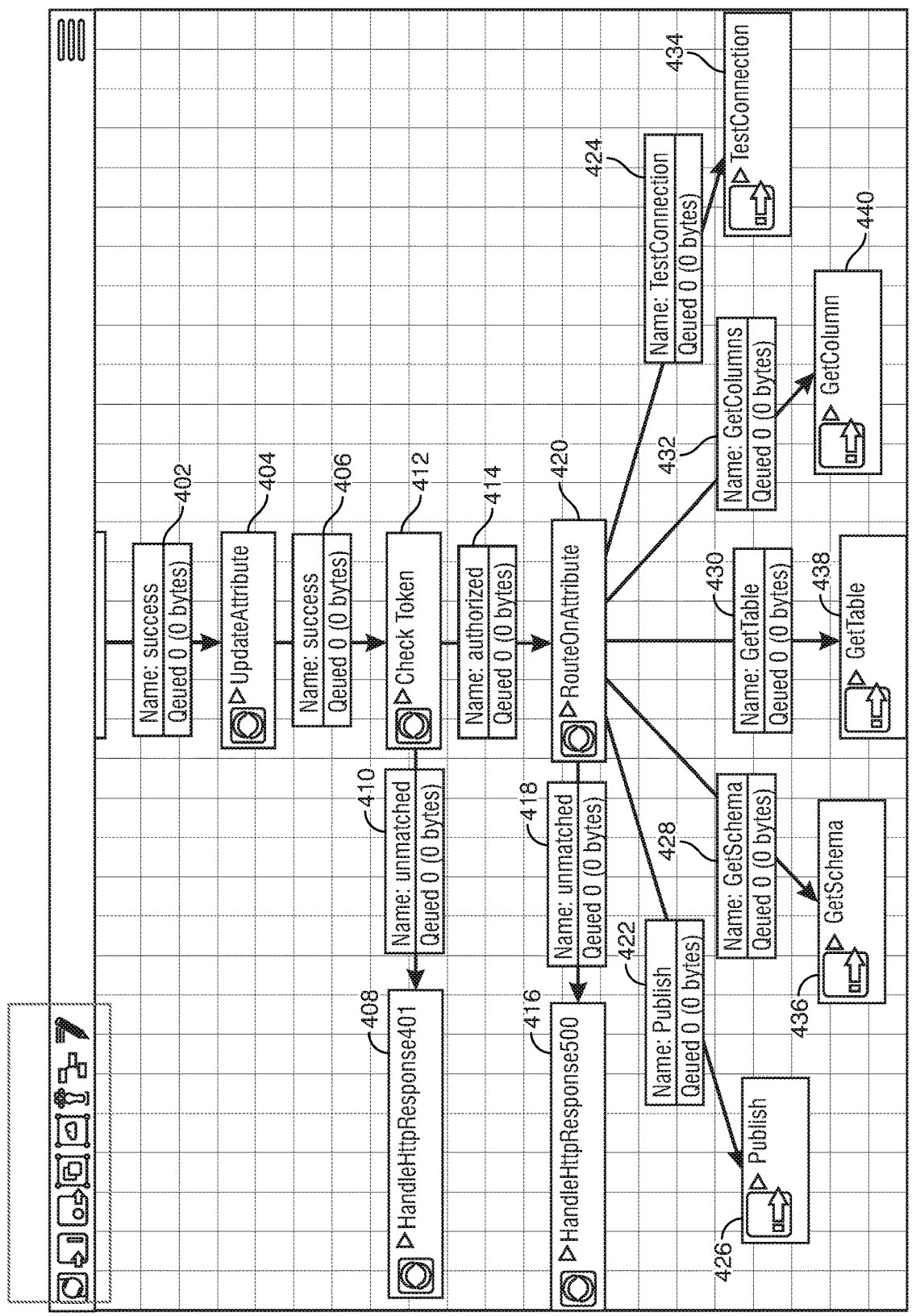
FIG. 4 shows still another illustrative diagram in accordance with principles of the disclosure.

FIG. 4 shows an illustrative diagram. The illustrative diagram may show a user subscribing to a publication.

A processor (not shown) may be listening on a specific port for incoming port-specific requests. Upon successfully identifying a port-specific request, as shown at queue 402, update attribute processor 404 may update an attribute associated with the port-specific request. The port-specific request may include request for a subscription to a publication.

Check token processor 412 may be triggered by update attribute processor 404 via queue 406. Check token processor 412 may check that the requestor included a permissions token with the request. In the event that a token was not transmitted, handle http response 408 may be triggered via queue 410.

Upon identification and validation of the transmitted token, route on attribute processor 420 may be triggered via queue 414. Route on attribute processor 420 may communicate with publish processor 426, get schema processor 428, get table processor 430, get column processor 432 and test connection processor 434, via queues 422, 428, 430, 432 and 424 to retrieve data relating to publishing, schema, table, column and database connection details relating to the publication to which the user is subscribing. Route on attribute processor 420 may display, and receive user input, at the user interface, relating to publishing, schema, table, column and database connection details relating to the subscription.

In the event that the subscription registration is unsuccessful, route on attribute processor 420 may trigger handle http response processor 416, via queue 418.

Figure 5:
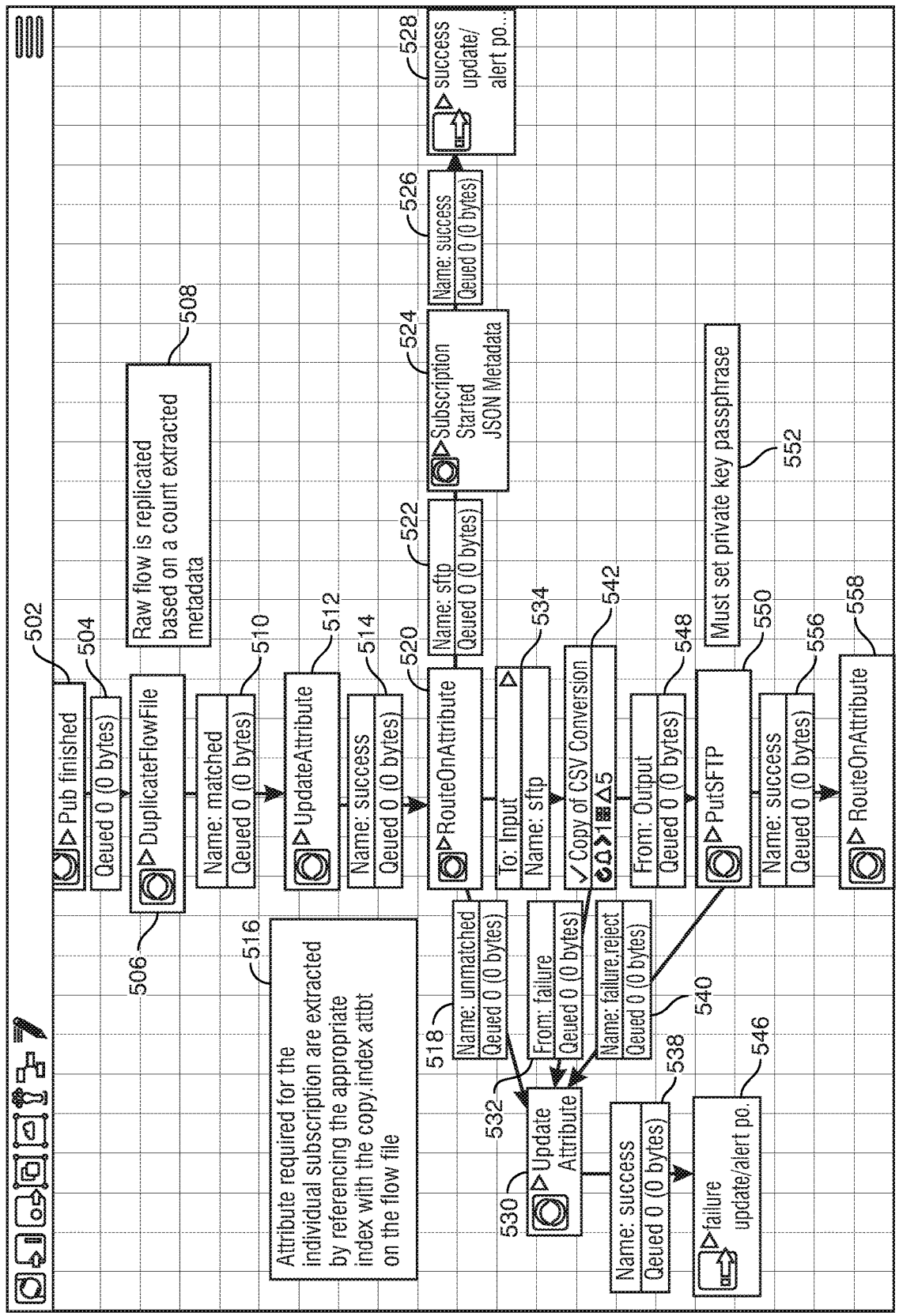
FIG. 5 shows yet another illustrative diagram in accordance with principles of the disclosure.

FIG. 5 shows an illustrative diagram. The illustrative diagram shows the transfer of flow files from a publisher to a subscriber. Flow files may be the internal unit of work within Apache nifi. The subscriber may include a file transfer protocol processor. The file transfer protocol may receive the flow files.

Processor 502 shows that a publication has been completed. Processor 502 triggers duplicate flow file 506 via queue 504. The raw flow file may be replicated based on the number of subscribers that subscribed to the publication. The number of subscribers may be included in the metadata, as shown at 508.

Duplicate flow file processor 506 may trigger update attribute processor 512 via queue 510. Update attribute processor 512 may extract an attribute required for each individual subscription. Update attribute processor 512 may execute the extraction by referencing the appropriate flow file index with the corresponding copy of the publication, as shown at 516.

Update attribute processor 512 may trigger route on attribute 520 via queue 514. Route on attribute processor 520 may trigger subscription started JSON metadata processor 524 via queue 522. Subscription started JSON metadata processor 524 may initiate the subscription initiation process.

Subscription started JSON metadata processor 524 may trigger success/update alert processor 528 via queue 526.

Success/update alert processor 528 may transmit an alert when a subscription is successfully started. Success/update alert processor 528 may also be triggered from other processors.

Route on attribute 520 may also trigger update attribute 530 via queue 518 in the event of an unmatched failure. Route on attribute 520 may also trigger copy of comma separated value ("CSV") conversion processor 542 via queue 534.

Copy of CSV conversion processor 542 may trigger update attribute 530 via queue 532 in the event of a failure. Copy of CSV conversion processor 542 may trigger put SFTP processor 550 via queue 548.

Put SFTP processor 553 may require a user to set a private key passphrase, as shown at 552. Upon successful entry of a private key passphrase, put SFTP processor 550 may trigger route on attribute 558. In the event of a failed private key passphrase entry, put SFTP processor 550 may trigger update attribute 530 via queue 540.

Figure 6:
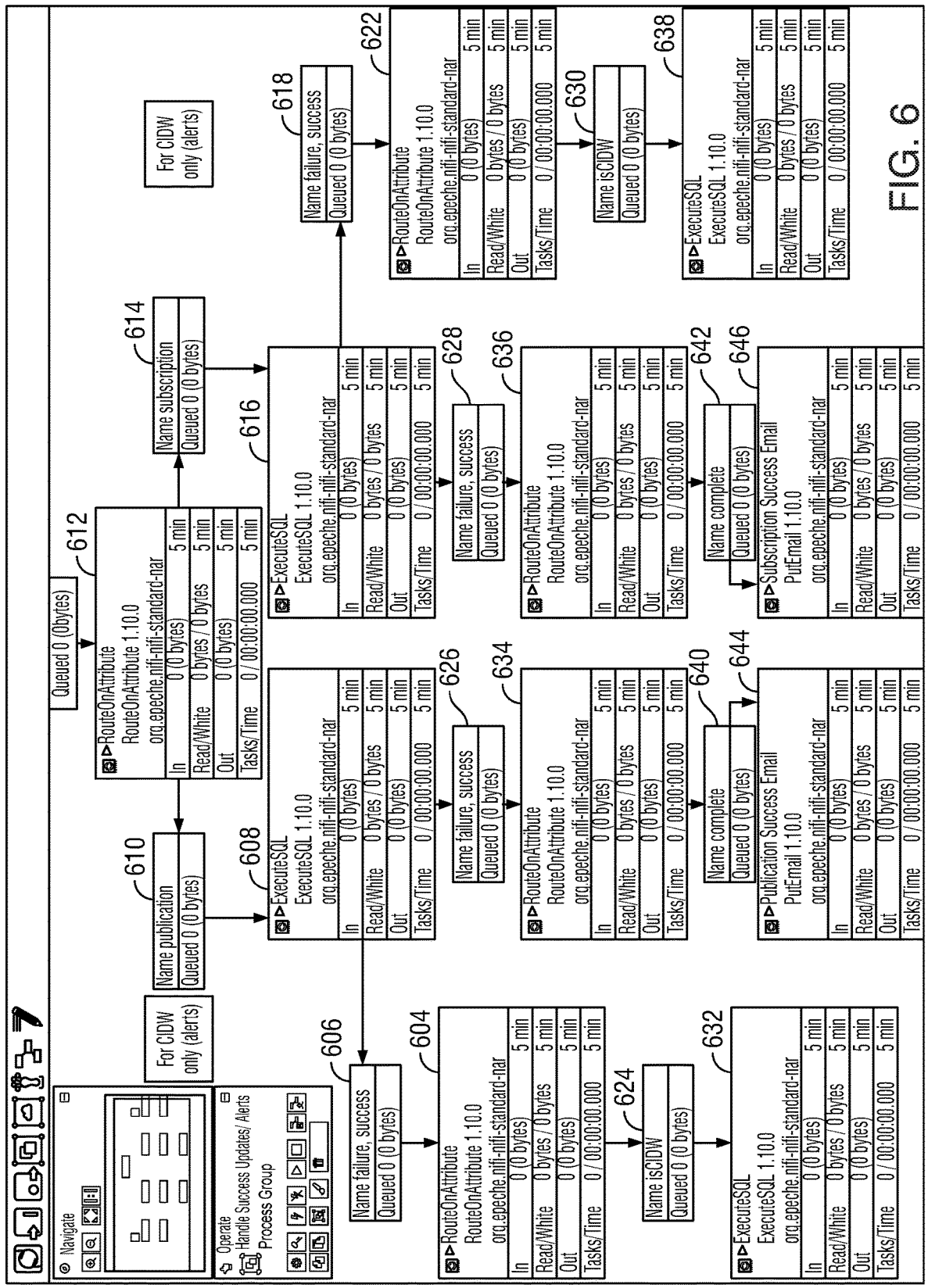
FIG. 6 shows still another illustrative diagram in accordance with principles of the disclosure.

FIG. 6 shows an illustrative diagram. The illustrative diagram shows a recipe that records the various data transfers and subscriptions that are executed within the system. This recipe captures the data lineage and data provenance of the data transfers. This recipe is used by databases to tap into the data transfers that transpire within the system.

Route on attribute processor 612 may trigger execute SQL processors 608 and 616, via queues 610 and 614. Execute SQL processor 608 may trigger route on attribute 604, via queue 606. Route on attribute processor 604 may trigger execute SQL processor 632 via queue 624. Execute SQL processor 632 may generate an alert.

Execute SQL processor 608 may trigger route on attribute 634 via queue 626. Route on attribute 634 may trigger publication success email processor 644 via queue 640.

Execute SQL processor 616 may trigger route on attribute processor 622. Route on attribute processor 622 may trigger execute SQL processor 638 via queue 630. Execute SQL processor 638 may generate an alert.

Execute SQL processor 608 may trigger route on attribute 634 via queue 626. Execute SQL processor 634 may trigger publication success email processor 644 via queue 640.

Execute SQL processor 616 may trigger route on attribute 636 via queue 628. Route on attribute 636 may trigger subscription success email processor 646 via queue 642.

FIG. 7 shows an illustrative diagram. The illustrative diagram includes a distribute user interface. The distribute user interface include deliveries tab 704, resources tab 706, approvals tab 708, data catalog tab 710 and configurations tab 712.

The user interface is open to resources tab 706. Resources tab may include publications tab 714 and subscriptions tab 716. Applications drop-down field 702 may enable a user to select from a variety of applications.

A user may be able to create a publication by selecting create publication button 718. A list of existing publications may be shown in box 732. The list of existing publications may include name of publication, shown at 720, type of publication, shown at 722, date the publication was created, shown at 724 and actions available to execute on the publication, shown at 730. Actions available to execute on the publication may include deleting and/or editing the publication.

The name of each publication may be a hyper-link. When selected, the hyper-link may direct a user to the user interface shown in FIG. 8.

FIG. 8 shows an illustrative diagram. The illustrative diagram may be a user interface that follows the user interface shows in FIG. 7.

The user interface may include details relating to the general ledger dimension publication, as shown at 802. The user interface may show various components of the publication. The components may be displayed as described below. The user interface may show connection details, shown at 804. The user interface may show schema details at 806. The user interface may show table details at 808. The user interface may show columns selection at 810. The user interface may show row filters at 812. The user interface may show feed size at 814. The user interface may show name at 816. The user interface may show description at 818.

The user interface may enable a user to modify the publication details by selecting each property. The user interface may enable a user to select save at 820 to save changes made to the publication details.

FIG. 9 shows an illustrative diagram. The illustrative diagram may be a user interface open to deliveries tab 902. Deliveries tab 902 may display the delivery status of a plurality of publications, as indicated at 904.

Deliveries tab 902 may also include table 906. Table 906 may include a delivery status of the plurality of publications. Table 906 may include the plurality of publications shown at rows 908, 910, 912, 914, 916 and 918. Table 906 may include delivery details relating to the delivery of each publication. The delivery status may include a successful delivery, a pending delivery and/or a failed delivery.

FIG. 10 shows an illustrative diagram. The illustrative diagram may be a user interface open to data catalog tab 1002. Data catalog tab 1002 may display available publications to which a user may subscribe. Available publications, shown at 1004, may include test publication 1006, CRP publication 1008, general ledge dimension publication 1010, test date format publication 1012. A user may subscribe to a publication may selecting a subscribe button within the row that identifies the publication. When a user selects the subscribe button, the user may be directed to another user interface, such as one shown in FIG. 11.

Figure 11:
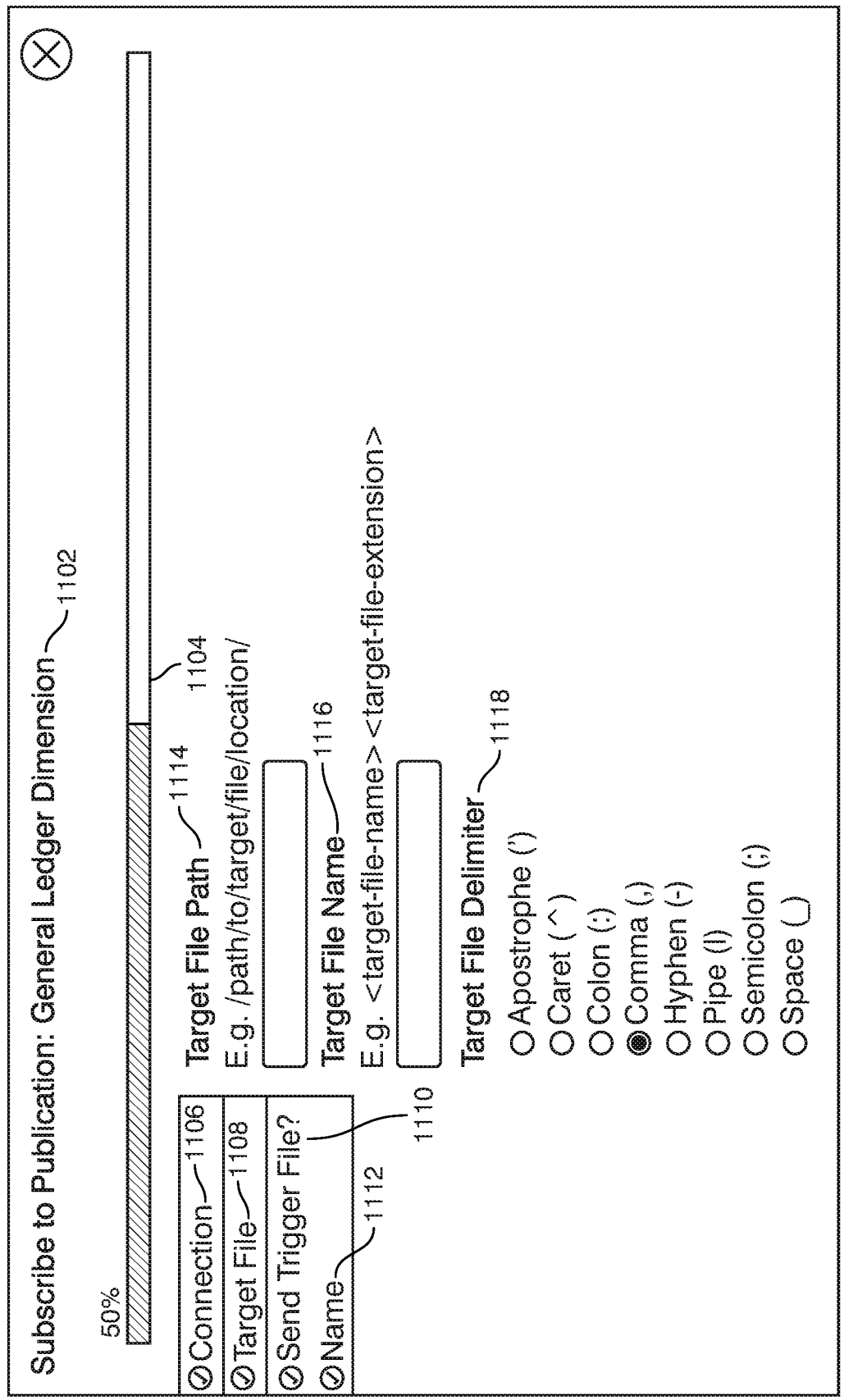
FIG. 11 shows yet another illustrative diagram in accordance with principles of the disclosure.

FIG. 11 shows an illustrative diagram. The illustrative diagram may display subscribing to a publication, as shown at 1102. Bar 1104 may show the percentage of completion of the subscription. There may be requests to complete a subscription registration. The requests may include connection 1106, target file 1108, send trigger file 1110 and name 112. In order to complete the subscription registration, each of the requests may be a prerequisite the subscription registration completion.

Target file path 1114 may request entry of a target file path to which that the subscription may be transmitted. Target file name 1116 may request entry of a target file name to which the subscription may be transmitted. Target file delimiter 1118 may request selection of a delimiter. The selected delimiter may be used to appropriately form the target file based on the subscriber request.

FIG. 12 shows an illustrative diagram. The illustrative diagram may be a user interface. The user interface may be open to approvals tab 1202. Approvals tab 1202 may include approvals 1206 and my submissions 1208. Once a subscription submission is transmitted, the subscription may be pending until approved. As such, approvals 1206 may display subscriptions that have been approved, and my submissions 1208 may display subscription submissions that are pending, as shown at 1210.

Figure 13:
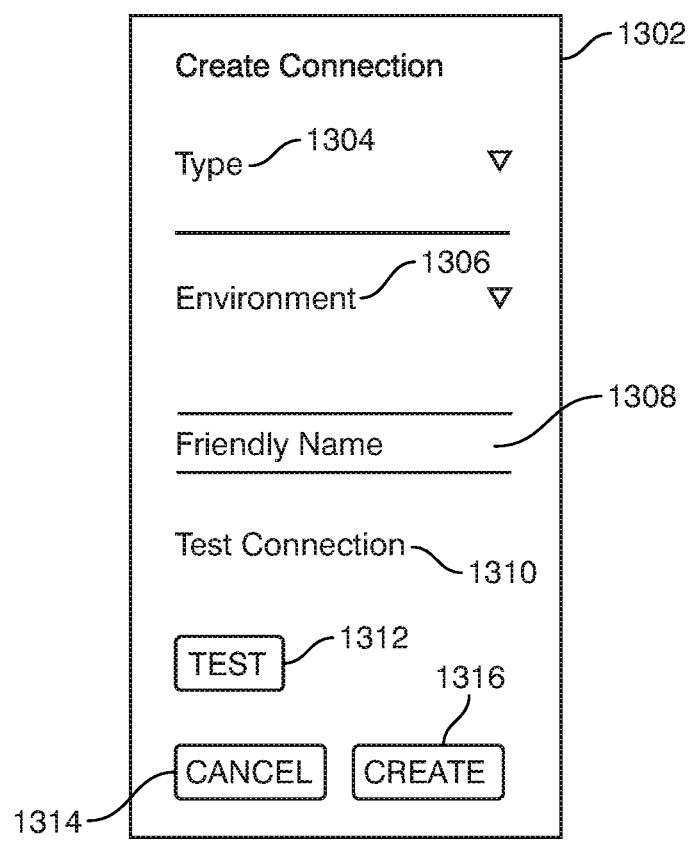
FIG. 13 shows yet another illustrative diagram in accordance with principles of the disclosure.

FIG. 13 shows an illustrative diagram. The illustrative diagram may a user interface 1302. User interface 1302 may enable a user to create a connection. User interface 1302 may request type, as shown at 1304. User interface 1302 may request environment, as shown at 1306. User interface may request name, as shown at 1308. User interface may enable testing of the connection, as shown at 1310, by selecting test button 1312. User interface may cancel the connection by selecting 1314. User interface may create the connection by selecting create button 1316.

Figure 14:
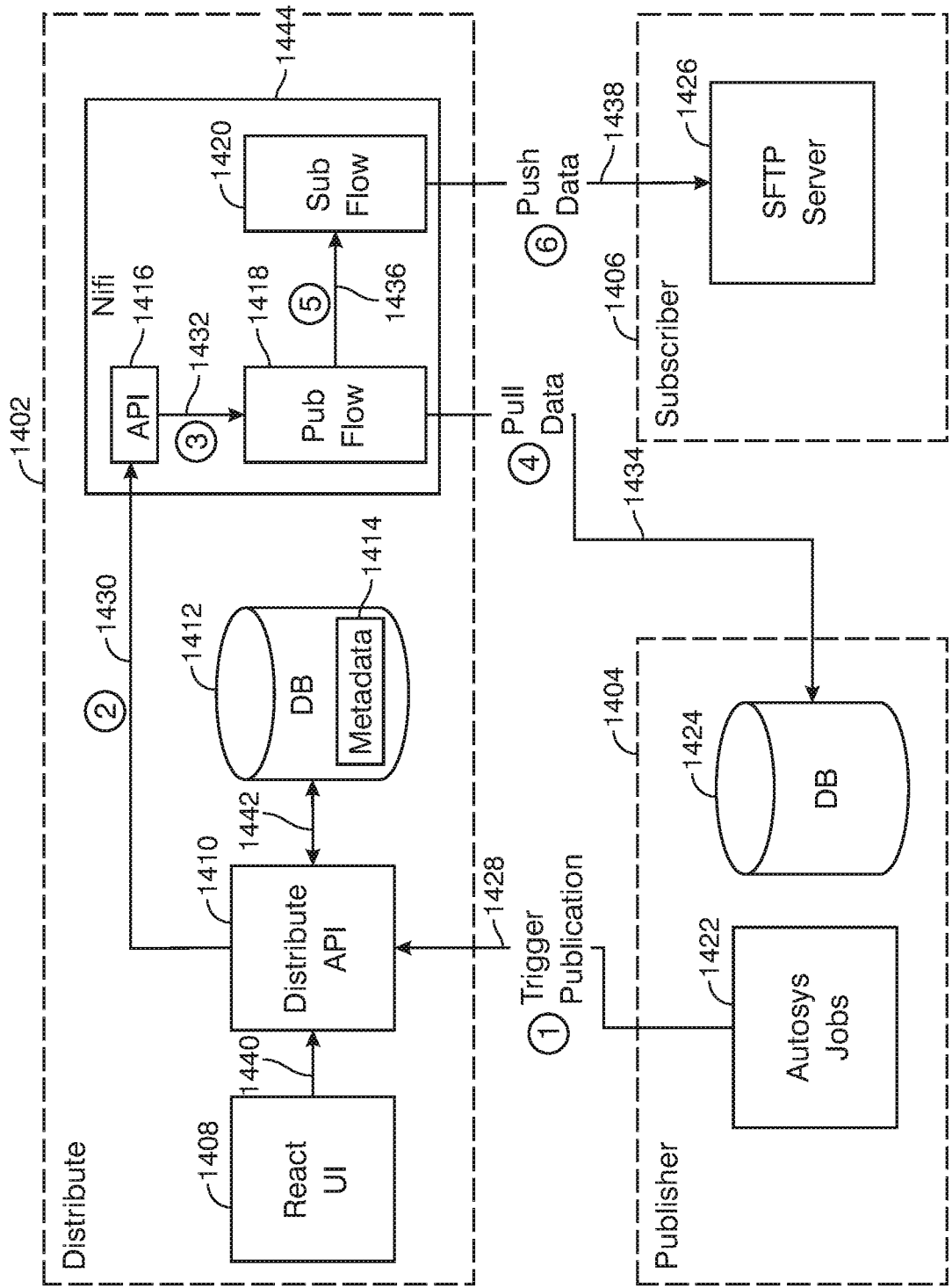
FIG. 14 shows still another illustrative diagram in accordance with principles of the disclosure.

FIG. 14 shows an illustrative diagram. Distribute module 1402 may interact with publisher 1404 and subscriber 1406. Although one publisher and one subscriber are shown in FIG. 14, it should be appreciated that multiple publishers and multiple subscribers may utilize distribute module 1402.

Distribute module 1402 includes react user interface ("UP") 1408. React UI 1408 may be a user interface that enables publishers and/or subscribers to register, or subscribe to, a publication.

A publisher, such as publisher 1404, may register a publication. When registering a publication, react UI 1408 may present a publisher with a list of questions about the publication in order to register the publication. The list of questions may include questions relating to connection details and database details. Connection details and database details may include details relating to a connection to a source or target system. The source or target system may be a database, a secure file transfer protocol ("SFTP") server, a Kafka™ topic, a Hadoop™ cluster or other suitable system. Connection properties may include a connection uniform resource locator ("URL"), a port number, a username and/or a password. The list of questions may also include details relating to the publication schedule—i.e., the frequency of publication.

Distribute module 1402 may receive details relating to the publication. Upon receipt of the details relating to a particular publication, distribute module 1402 fetches, from the database included in the publisher, a list of tables included in the publication as well as a list of columns and rows included in each table. A process within Nifi™ 1444 may execute the fetching. The list of tables as well as the list of columns and rows may be presented to the publisher. The publisher may be presented, within react UI 1408, the functionality to select one or more tables to be published. The publisher may also be presented, within react UI 1408, the functionality to select columns and/or rows within the table to be published. The publisher may also be presented, within react UI 1408, the functionality to select/deselect column/row filters for the publication.

Upon receipt of a confirmation from the publisher, the metadata, relating to the publication, may be transmitted to distribute application programming interface ("API") 1410 via communication 1440. Distribute API 1410 may transmit the metadata, relating to the publication, to database ("DB") 1412 via communication 1442. Database 1412 may store the metadata, relating to the publication, within metadata store 1414. Metadata store 1414 may be included in DB 1412. It should be appreciated that DB 1412 may be a datastore, file system or any other suitable data storage platform.

A subscriber, such as subscriber 1406, may subscribe to a publication. When subscribing to a publication, react UI 1408 may present a subscriber with a list of questions about the subscription in order to register the subscription. The list of questions may include subscriber scheduling questions. As such, a subscriber may receive the publication on a different scheduler that what was published by the publication.

The subscriber may subscribe to a publication by selecting the publication. The subscriber may select the publication from a list of available publications. The subscriber may select the publication by entering publication data into a subscription data entry field on react UI 1408.

Upon a subscriber's selection to a particular publication, react UI 1408 may present to the subscriber the particular tables, columns and/or rows that are being published from this publication. The subscriber may select the entire publication and/or a subset of tables, columns and/or rows. The subscriber may also filter the publication in order to receive a subset of the publication. For example, a publication may include five products. A subscriber may request data relating to one of the five products. Therefore, a filter may be instituted so that the subscriber receives data relating to the one product.

It should be appreciated that, although the subscriber filters the subscription to the publication, the publication is not altered in any manner. As such, a publication may be published one time and many subscribers may receive various subsets of the publication without interfering with the publication or the publisher. Therefore, the publication may have a one-to-many relationship with a subscription—i.e., one publication may satisfy multiple subscriptions.

Upon receipt of a confirmation from the subscriber, the metadata, relating to the subscription, may be transmitted to distribute application programming interface ("API") 1410 via communication 1440. Distribute API 1410 may transmit the metadata, relating to the subscription, to database ("DB") 1412 via communication 1442. Database 1412 may store the metadata, relating to the subscription, within metadata store 1414. Metadata store 1414 may be included in DB 1412.

It should be appreciated that, upon registration of a publication and/or subscription, data has not yet been transferred from a publisher to a subscriber. Data may be transferred when the publication is published.

It should be yet further appreciated that the publisher may own the data included in the publication as well as a schedule of when the publication is published. Therefore, publisher 1404 may trigger the publishing of a publication. A publication may be ready to be published when all of the processes and extract, transform and load ("ETL") jobs have been completed.

When publisher 1404 determines that a publication is in a state to be published, a job scheduling command, such as an Autosys™ command, may trigger the running of the publication. The job scheduling command may trigger publication, as shown at 1428, by calling an endpoint on distribute API 1410. The call may include a unique identifier that was generated for the publication that was previously set up using react UI 1408. The call may state that the publisher is ready to trigger the publication. Distribute API 1410 pulls the metadata for the publication from metadata store 1414. Distribute API 1410 also pulls the metadata for the subscribers of the publication from metadata store 1414. Distribute API 1414 combines the metadata, relating to the publication and the publisher, and the metadata, relating to the publication and the one or more subscribers, into one payload of metadata.

The payload of metadata may be transmitted from distribute API 1410 to API 1416, via communication 1430. API 1416 may be included in Nifi™ 1444. Nifi™ 1444 may be included in distribute module 1402. Nifi™ 1444 may be an open source data engine by Apache™. Nifi™ 1444 may responsible for the actual data transfer from one location to another location. Nifi™ 1444 may also be responsible for performing the data filtering.

API 1416 receives the payload of metadata, identifies the publisher and calls publication flow 1418 via communication line 1432. Publication flow 1418 uses the metadata received about the publication, and therefore, identifies which datastore to access and which tables/rows/columns to retrieve. Publication flow 1418 accesses database 1424 and retrieves the identified data set. At this point, the data set exists in Nifi™ 1444.

Publication flow 1418 transmits the data set to subscriber flow 1420 via communication 1436. Together with the data set, publication flow 1418 also transmits metadata about the one or more subscriptions. Subscriber flow 1420 may use the received metadata in order to customize the data set for each subscriber. Such customization may include filtering the data set. Such customization may also include identifying and naming files appropriately. Such customization may also include, for delimited data sets, identifying, and altering, as necessary for the subscriber, a delimiter that is included within the data set. Such customization may also include enabling a subscriber to receive data in any requested format. A publication may be published in a Hadoop™ format, a Kafka Topic™ format, a structured query language ("SQL")™ format, a text file, a file transfer protocol ("FTP") server format or any other suitable data storage format on any suitable data storage platform. Such a publication may be received at the subscriber in any requested format. The requested format may be a Hadoop™ format, a Kafka™ topic format, a structured query language ("SQL")™ format, a text file, a file transfer protocol ("FTP") server format or any other suitable data storage format on any suitable data storage platform. As such, the data engine may mediate between various platforms, such as Hadoop™, Kafka™, SQL™, text files and FTP servers.

It should be appreciated that react UI 1408 may generate recipes within Nifi™ data engine 1444 at the time of registering the data set based on what is published by the publisher and what is subscribed to by the one or more subscribers. The generated recipes may be used in communications 1432 and 1436.

Subscriber flow 1420 may push the data set, or subset of the data set, to one or more servers, located at one or more subscribers. The communication between subscriber flow 1420 and server 1426 may be shown at 1438.

After a publication is published, the publication may only be transferred when required by a subscriber. As such, a publication may be retrieved by the data engine based on the subscriber's schedule.

Thus, a trihybrid data movement, data governance and data provenance system is provided. Persons skilled in the art will appreciate that the present invention can be practiced by other than the described embodiments, which are presented for purposes of illustration rather than of limitation. The present invention is limited only by the claims that follow.

What is claimed is:

1. A processor executing a user interface for interfacing with a trihybrid data movement, data governance and data provenance system, the user interface comprising:
   an application selection drop-down field, said application selection drop down field enables a user to select an application;

a deliveries tab, when selected, displays a status of subscription deliveries;
a resources tab, when selected:
   displays publications and/or subscriptions that have been set up; and
   enables the user to create a new publication;
an approvals tab, when selected, displays approvals relating to subscriptions that have been requested; and
a data catalog tab, when selected:
   displays a plurality of available publications; and
   enables the user to request a subscription to one or more publications included in the plurality of available publications.

2. The processor of claim 1, wherein:
the user interface is included in a distribute module, and the distribute module further comprises:
   a distribute application programming interface, said distribute application programming interface communicates with the user interface;
   a distribute module database, said distribute module communicates with the distribute application programming interface, said distribute module database comprising:
      a metadata store;
   a data engine, said data engine comprising:
      a data engine application programming interface;
      a publisher flow application, said publisher flow application communicates with the data engine application programming interface; and
      a subscriber flow application, said subscriber flow application communicates with the publisher flow application;
   a publisher comprising:
      a job scheduler, said job scheduler publishes a publication; and
      a publisher datastore, said publisher datastore comprising the publication;
   a subscriber comprising:
      a subscriber server, said subscriber server receives the publication;
wherein:
   the job scheduler triggers the publishing of the publication by calling an endpoint on the distribute application programming interface, the calling comprises transmitting a unique identifier generated for the publication from the job scheduler to the distribute application programming interface;
   the distribute application programming interface retrieves from the metadata store included in the distribute module database:
      publisher metadata relating to publication, said publisher metadata comprising location of publication; and
      subscriber metadata relating to the subscriber; and
   the distribute application programming interface combines the publisher metadata and the subscriber metadata into one metadata payload.

3. The processor of claim 2, wherein the distribute application programming interface transmits the one metadata payload to the data engine application programming interface.

4. The processor of claim 3, wherein the data engine application programming interface transmits the one metadata payload to the publisher flow application.

5. The processor of claim 4, wherein the publisher flow application retrieves the publication, based on the one metadata payload, from the publisher datastore.

6. The processor of claim 5, wherein the publisher flow application transmits the retrieved publication and the one metadata payload to the subscriber flow application.

7. The processor of claim 6, wherein the subscriber flow application filters the publication based on the subscriber metadata included in the one metadata payload.

8. The processor of claim 7, wherein the subscriber flow application transmits the filtered publication to the subscriber server.

9. The processor of claim 1, wherein:
the user interface is included in a distribute module, and the distribute module further comprises:
   a distribute application programming interface, said distribute application programming interface communicates with the user interface;
   a distribute module database, said distribute module communicates with the distribute application programming interface, said distribute module database comprising:
      a metadata store;
   a data engine, said data engine comprising:
      a data engine application programming interface;
      a publisher flow application, said publisher flow application communicates with the data engine application programming interface; and
      a subscriber flow application, said subscriber flow application communicates with the publisher flow application;
   a publisher comprising:
      a job scheduler, said job scheduler publishes a publication; and
      a publisher datastore, said publisher datastore comprising the publication;
   a plurality of subscribers, each subscriber, included in the plurality of subscribers, comprising:
      a subscriber server, said subscriber server receives a predetermined subset of the publication, said predetermined subset specified by the subscriber;
wherein:
   the job scheduler triggers the publishing of the publication by calling an endpoint on the distribute application programming interface, the calling comprises transmitting a unique identifier generated for the publication from the job scheduler to the distribute application programming interface;
   the distribute application programming interface retrieves from the metadata store included in the distribute module database:
      publisher metadata relating to publication, said publisher metadata comprising location of publication; and
      subscriber metadata, said subscriber metadata comprising:
         the plurality of subscribers; and
         for each of the subscribers included in the plurality of subscribers, metadata relating to the predetermined subset of the publication; and
   the distribute application programming interface combines the publisher metadata and the subscriber metadata into one metadata payload.

10. The processor of claim 9, wherein the distribute application programming interface transmits the one metadata payload to the data engine application programming interface.

11. The processor of claim 10, wherein the data engine application programming interface transmits the one metadata payload to the publisher flow application.

12. The processor of claim 11, wherein the publisher flow application retrieves the publication, based on the one metadata payload, from the publisher datastore.

13. The processor of claim 12, wherein the publisher flow application transmits the retrieved publication and the one metadata payload to the subscriber flow application.

14. The processor of claim 13, wherein the subscriber flow application filters the publication for each subscriber, included in the plurality of subscribers, based on the subscriber metadata, said subscriber metadata that includes the predetermined subset of the publication included the one metadata payload.

15. The processor of claim 14, wherein the subscriber flow application transmits each predetermined subset of the publication, as specified by the subscriber, to each subscriber server.

16. A method for interfacing with a trihybrid data movement, data governance and data provenance, the method comprising:
receiving, at a user interface, an application selection, wherein a distribute application programming interface commands the user interface;
displaying, at a deliveries tab within the user interface, a status of user subscription deliveries, said user subscription deliveries identified by the application selection;
displaying, at a resources tab within the user interface, user publications and/or subscriptions that have been set up;
displaying, at an approvals tab within the user interface, user approvals relating to subscriptions that have been requested;
displaying, at a data catalog tab within the user interface, a plurality of available publications; and
enabling, at the data catalog tab within the user interface, receipt of subscription requests to one or more publications included in the plurality of available publications;
receiving, at the resources tab within the user interface, a request to register a publication, wherein a distribute application programming interface commands the user interface;
displaying, at the user interface, a plurality of database and/or connection questions;
receiving, at the user interface, a set of responses to the plurality of database and/or connection questions;
fetching, from a datastore linked to the publisher, a list of tables, columns and rows, included in the publication;
presenting, via the user interface, the list of tables, columns and rows to the publisher;
receiving a selection, via the user interface, of a list of tables, columns and rows to be published;
receiving a registration confirmation from the publisher via the user interface;
upon receipt of the registration confirmation from the publisher, transmitting a set of publication metadata to a metadata store within a distribute database via a distribute application programming interface, said set of publication metadata comprising the set of responses and the selection of the list of tables, columns and rows;
receiving, from a subscriber, at the user interface, a request to subscribe to the publication;
displaying to the subscriber, at the user interface, the set of publication metadata;
receiving, from the subscriber, at the user interface, a selection of one or more tables, columns and/or rows from the set of publication metadata;
receiving a subscription confirmation from the subscriber via the user interface;
upon receipt of the registration confirmation from the subscriber, transmitting a set of subscription metadata to the metadata store via the distribute application programming interface, said set of subscription metadata comprising a subscriber datastore location and the selection, received from the subscriber;
triggering, by a job scheduler, the publishing of the publication by calling an endpoint on the distribute application programming interface;
retrieving, by the distribute application programming interface, from the metadata store, the set of publication metadata and the set of subscription metadata;
combining the set of publication metadata and the set of subscription metadata into a metadata payload;
transferring the metadata payload from the distribute application programming interface to a data engine application programming interface;
identifying the publisher based on the metadata payload at the data engine application programming interface;
calling a publication flow application from the data engine application programming interface, said calling including transferring the metadata payload to the publication flow application;
using the metadata payload at the publication flow application to retrieve the publication from the datastore linked to the publisher;
transmitting the publication and the set of subscription metadata from the publication flow application to a subscription flow application;
customizing the publication into a subscriber-customized publication at the subscription flow application, said customizing based on the set of subscription metadata; and
transmitting the subscriber-customized publication from the subscription flow application to a server associated with the subscriber.

17. The method of claim 16, wherein the triggering the publishing of the publication comprises transmitting a unique identifier from the job scheduler to the distribute application programming interface.

18. The method of claim 17, wherein the unique identifier is generated for the publication upon the receipt of the registration confirmation from the publisher.

19. The method of claim 18, wherein a data engine includes the data engine application programming interface, the publication flow application and the subscription flow application.

* * * * *